United States Patent [19]

Takemura

[11] Patent Number: 5,734,453
[45] Date of Patent: Mar. 31, 1998

[54] ELECTRO-OPTICAL DEVICE AND METHOD OF DRIVING THE SAME

[75] Inventor: Yasuhiko Takemura, Atsugi, Japan

[73] Assignee: Semiconductor Energy Laboratory Co., Ltd., Kanagawa, Japan

[21] Appl. No.: 51,686

[22] Filed: Apr. 23, 1993

[30] Foreign Application Priority Data

Apr. 28, 1992 [JP] Japan ................... 4-135864

[51] Int. Cl.[6] .................. G02F 1/1333; G09G 3/36
[52] U.S. Cl. .................. 349/54; 349/37; 345/92
[58] Field of Search .......... 359/57, 59; 345/92, 345/94, 95; 349/54, 37, 143

[56] References Cited

U.S. PATENT DOCUMENTS

| | | | |
|---|---|---|---|
| 4,697,887 | 10/1987 | Okada et al. | 359/59 |
| 4,770,501 | 9/1988 | Tamura et al. | 359/59 |
| 4,973,135 | 11/1990 | Okada et al. | 345/92 |
| 5,151,805 | 9/1992 | Takeda et al. | 359/57 |
| 5,227,899 | 7/1993 | Nobuyuki | 359/87 |

*Primary Examiner*—William L. Sikes
*Assistant Examiner*—Charles Miller
*Attorney, Agent, or Firm*—Sixbey, Friedman, Leedom & Ferguson, P.C.; Gerald J. Ferguson, Jr.; Karlton C. Butts

[57] ABSTRACT

An active matrix display device including TFTs, picture-element electrode, stripe-shaped counter electrodes and liquid crystal interposed between these electrodes. The stripe-shaped counter electrodes are independently driven, and supplied with a pulse having opposite polarity to a pulse to be applied to the gate lines of the TFTs in synchronism with the pulse to the gate lines to thereby depress voltage variation $\Delta V$ due to parasitic capacitance between the gate electrode of the TFT and the picture-element electrode, etc.

25 Claims, 3 Drawing Sheets

ELECTRO-OPTICAL DEVICE AND METHOD OF DRIVING THE SAME

BACKGROUND OF THE INVENTION

1. Field of the Invention

This invention relates to an electro-optical device such as a liquid crystal display device, and particularly to a display device having an active matrix circuit.

2. Description of Prior Art

Recently, an active matrix circuit for driving a liquid crystal display has been actively studied, and put into practical use. As an active element has been proposed one having a construction that one conductive-type thin film transistor (TFT) is used for a picture element. Such an active matrix circuit has a plurality of capacitors each of which comprises a picture-element electrode, a counter electrode and liquid crystal interposed between these electrodes as shown in FIG. 2(A), and charges to be supplied to and discharged from the capacitor are controlled by a TFT which is assigned to each capacitor. In order to perform a stable image display, a voltage across both electrodes of each capacitor has been required to be kept constant, however, it has been difficult to satisfy the above requirement for some reasons.

One of the reasons is that a gate signal to be applied to the gate electrode of the TFT is capacitively coupled to the potential of the picture-element electrode by a parasitic capacitance between the gate electrode of the TFT and the picture-element electrode to induce variation of a voltage ($\Delta V$). That is, representing a gate pulse (signal voltage) by $V_G$, a picture-element capacitance by $C_{LC}$ (containing an auxiliary capacitance, etc. inserted in parallel), and a parasitic capacitance between the gate electrode and the picture-element electrode by $C_1$, $\Delta V$ is represented by the following equation:

$$\Delta V = C_1 V_G / (C_{LC} + C_1)$$

If $C_1$ is larger than $C_{LC}$, $\Delta V$ is greatly increased. In this case, as shown in FIG. 2(B), the voltage $V_{LC}$ to be applied to the liquid crystal becomes asymmetrical through its alternating operation, and this asymmetrical voltage causes flicker or deterioration of liquid crystal material.

In order to remove such a voltage variation $\Delta V$, there has been conventionally proposed a method that, as shown in FIG. 2(C), a data signal $V_D$ is beforehand set to a higher value by $\Delta V$ to make $V_{LC}$ symmetrical as a consequence. However, in this case, the potential difference between a source/drain and the gate electrode is varied in accordance with the polarity of the data (that is, the potential difference is varied between cases where the data is positive and where the data is negative), and thus a driving capability is also varied. That is, in the case of FIG. 2(C), the potential difference between the gate electrode and the source/drain when the data is negative becomes larger than that when the data is positive. Therefore, the charging status of the picture element is different between the positive data and the negative data, and thus the voltage to be applied to the liquid crystal remains asymmetrical.

SUMMARY OF THE INVENTION

The occurrence of $\Delta V$ is originally caused by the application of a pulse to only the gate electrode in an ON/OFF operation of a TFT. If a proper voltage variation is imposed on other electrodes of the TFT, the contribution of the gate pulse to the picture-element electrode would be offset (canceled). The potential at the drain side (data side) can not be varied, however, the potential at the source side (picture-element electrode side) can be varied. The inventor of this application has found the above technical idea, and implemented this invention on the basis of the technical idea that $\Delta V$ is canceled (offset) by inputting a pulse to the counter electrode of the picture-element electrode in synchronism with the gate pulse such that the polarity of potential is opposite between the gate pulse and the counter electrode. A method of driving an electro-optical device in accordance with the present invention comprising:

a first substrate;

a pixel electrode provided on said first substrate;

a gate line provided on said first substrate;

at least one transistor provided on said first substrate and connected with said gate line at a gate thereof and connected with said pixel electrode at one of the source and drain thereof;

a second substrate opposed to said first substrate; and a stripe electrode opposed to said first substrate and provided on said second substrate in parallel with said gate line, said method comprises:

applying a pulse signal to said stripe electrode in synchronism with a pulse applied to said gate line.

More specifically, a method of driving an electro-optical device of an active matrix in accordance with the present invention comprising:

a first substrate;

a plurality of transistors provided on said first substrate;

a plurality of pixel electrodes provided on said first substrate, each of said pixel electrodes being connected with a corresponding at least one of said transistors at one of source and drain thereof;

a plurality of gate lines provided on said first substrate, each of said gate lines being connected with the corresponding pixel electrodes through the transistors connected therewith at gates of the transistors to make a matrix arrangement;

a second substrate opposed to said first substrate; and a plurality of stripe electrodes opposed to said first substrate and provided on said second substrate in parallel with said gate lines, each of said stripe electrodes being opposed to the corresponding pixel electrodes, said method comprises:

applying a pulse signal to each of said stripe electrodes in synchronism with a pulse applied to the gate line connected with the pixel electrodes opposed thereto.

The electro-optical device of the active matrix further comprises a plurality of data lines provided on said first substrate, each of said data lines being connected with the corresponding pixel electrodes through the transistors each connected therewith at the other one of the source and drain thereof.

That is, representing the parasitic capacitance between the gate electrode and the picture-element electrode by $C_1$; the capacitance of the picture-element electrode, $C_{LC}$; the potential of the counter electrode of a picture element in a normal state (non-selection state), $V_O$; the pulse height of a pulse to be applied to the gate electrode, $V_G$; and the potential of the counter electrode when the application of the pulse to the gate electrode is intermitted (that is, at the trailing edge of the pulse), $V_S$, the variation $\Delta V$ of the potential at the data side of the picture-element electrode is represented by the following equation:

$$\Delta V = -(C_1 V_G + C_{LC}(V_S V_3))/(C_1 + C_{LC})$$

If $V_S = V_O$, the data signal is lowered by $\Delta V$ like the prior art. However, if a condition that $V_S - V_O = -C_1 V_1 / C_{LC}$ is satisfied, $\Delta V$ is equal to zero. For example, if $C_1 = C_{LC}$, by setting $V_S - V_O$ to be equal to $V_1$, $\Delta V$ is mutually offset and thus is equal to zero. As described above, this invention is a positive method in that a voltage variation (increase) which can counteract $\Delta V$ is generated to offset $\Delta V$.

Further, according to the consideration of the inventor of this application, it has been also found that even when the gate pulse and the pulse of the counter electrode are not accurately synchronized with each other, the same effect obtained when these pulses are synchronized can be obtained by designing the circuit construction such that a pulse of a second wiring is intermitted (dropped) after the gate pulse is intermitted (dropped) although the potential of the picture-element electrode is temporally varied. With respect of a start time (rise-up) of the pulse, the start time (rise-up) of the gate pulse may be set earlier or later than that of the counter electrode. This is because $\Delta V$ occurs at the OFF time of the gate pulse. In order to supply the pulse to the counter electrode in synchronism with the gate pulse as described above, a uniform electrode as used in the prior art is not suitable. For example, a counter electrode having a stripe-shaped wiring is preferably formed in parallel to the gate electrode. The counter electrode may be formed of a stripe-shaped transparent conductive film, however, for the purpose of depressing a wiring resistance, it is preferably so designed that a metal wiring of low resistance such as aluminum is formed and a transparent electrode is connected with the metal wiring. At any rate, the ends of these wiring and electrode are connected to a driver, and a signal which is synchronized with the gate pulse is supplied thereto.

This means that a slight amount of parasitic capacitance of a TFT has no obstruction insofar as it is considered as a design factor. In the conventional method (FIG. 2), such a design that a picture-element electrode is overlapped with a gate line for driving the picture element has been inhibited because this design remarkably increases parasitic capacitance. In this point, this invention makes an epoch by breaking such a conventional custom. As described later, the above design of this invention is ideal in improving aperture ratio. This is because in the prior art attention has been mainly paid to the parasitic capacitance between the gate electrode/wiring and the picture-element electrode, and thus the picture-element electrode is formed away from the TFT and the gate wiring as far as possible, so that a large area is not effectively used. Particularly when an area to be assigned to one picture element is reduced, the aperture ratio tends to be reduced.

If the picture-element electrode is extremely small, the capacitance of the picture element itself is extremely small. On the other hand, it is technically difficult to design a TFT in compact size, and thus the parasitic capacitance is invariable. In this case, the minimum $\Delta V$ can be obtained by controlling the ratio of $V_1$ and $V_S - V_O$. For example, in a case of $C_1$: $C_{LC} = 1:2$, the ratio may be set as follows: $V_1 : V_S - V_O = 2 : -1$.

For example, for an amorphous silicon TFT or the like to which a self-alignment system is not applicable, parasitic capacitance thereof is greatly increased, but dispersion of the parasitic capacitance can be controlled with high accuracy. For example, it can be controlled within 10% in accuracy. The capacitance of the counter electrode can be also con-trolled with high accuracy. Now, representing the above parasitic capacitance by $C_1$, the capacitance of the counter electrode can be designed to be five times as large as $C_1$. In the conventional method, $\Delta V = (0.17 \pm 0.017) V_1$. However, when this invention is applied and $V_2$ is set to $-0.2 V_1$, $\Delta V = \pm 0.017 V_1$. That is, the dispersion of $\Delta V$ is invariable irrespective of application of this invention, however, the magnitude of $\Delta V$ can be reduced to a value below one-tenth (zero in average).

In the above description, the signal to be applied to the counter electrode is required to have an opposite polarity (opposite phase) to the gate pulse. This does not mean merely that when the gate pulse is positive, the signal of the counter electrode is negative. That is, in this invention, the pulse height of the optimum signal to be applied to the counter electrode corresponds to a value obtained by adding the potential of the counter electrode at the non-selection time with a potential of $-C_1 V_1 / C_2$. That is, the opposite polarity (opposite phase) of this invention means that the potential of the counter electrode is shifted (varied) in an opposite direction to that of the gate pulse. Therefore, when the potential of the gate electrode at the non-selection time and the potential of the counter electrode are set to 0V and 10V respectively, and the potential of the gate line at the selection time is set to 8V, the potential of the counter electrode is required to be below 10V, however, it is not required to be negative.

DETAILED DESCRIPTION OF THE INVENTION

A preferred embodiment of this invention will be described with reference to the accompanying drawings.

Figure 1A:
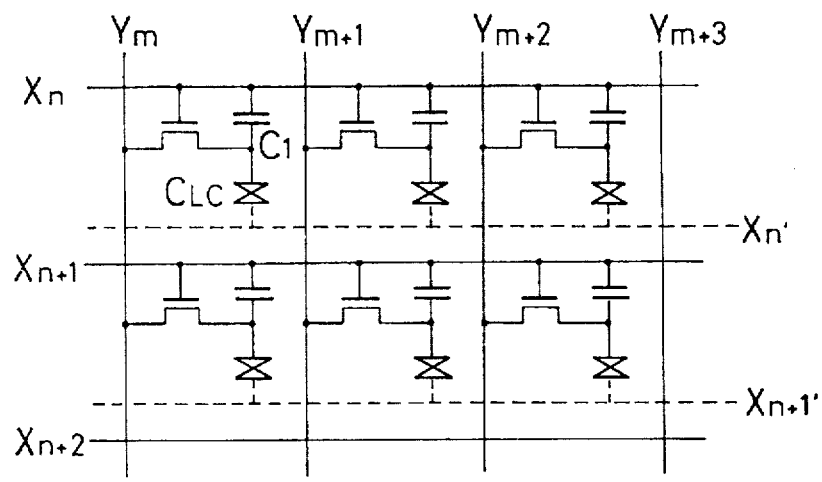
FIG. 1(A) shows a circuit construction of an active matrix circuit of this invention.
Figure 1B:
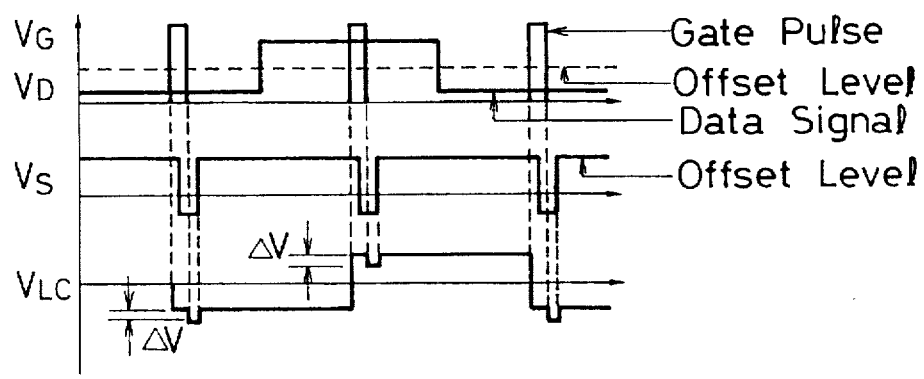
FIG. 1(B) is a schematic view showing a driving example of the active matrix circuit of this invention.
Figure 1C:
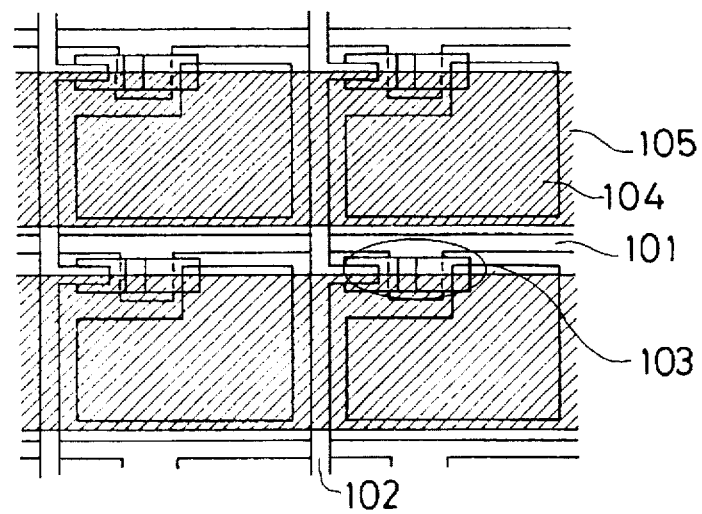
FIG. 1(C) shows a circuit arrangement of the active matrix circuit of this invention.
Figure 3:
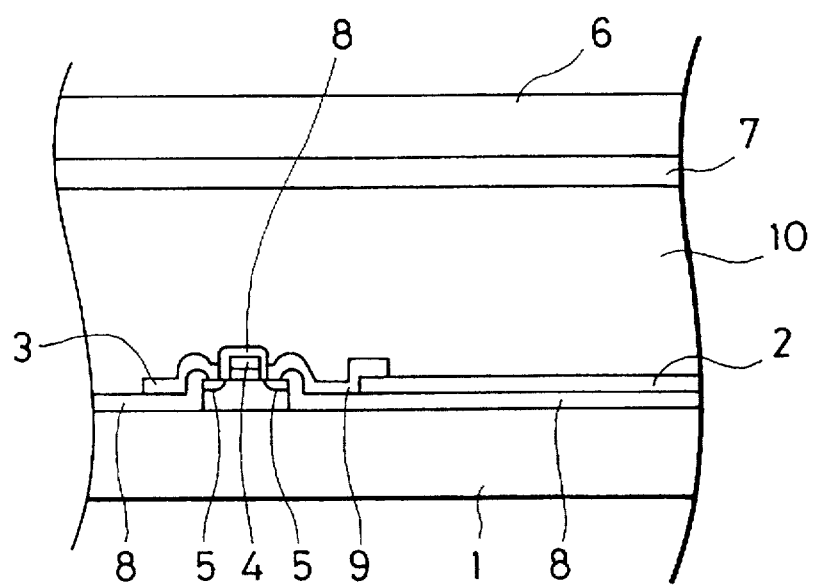
FIG. 3 is a cross-sectional view showing an electro-optical device in accordance with the present invention.

As shown in FIGS. 1(A) and 1(C) and 3, an electro-optical device of an active matrix in accordance with the present invention comprises:

a first substrate 1;

a plurality of pixel electrodes 2 provided on said first substrate;

a data line 3 provided on said first substrate;

a gate line provided on said first substrate;

at least one transistor provided on said first substrate 1 and connected with said gate line at a gate 4 thereof and connected with corresponding one of said pixel electrodes at one of source and drain 5 thereof and connected with said data line 3 at the other one of the source and drain;

a second substrate 6 opposed to said first substrate; and a plurality of stripe electrodes 7 opposed to said first substrate and provided on said second substrate 6 in parallel with said gate line. In FIG. 3, a reference numeral 8 designates an interlayer insulator, 9 designates a conductive film, and 10 designates an electro-optical modulating layer.

FIG. 1(A) shows a circuit construction of an embodiment of an active matrix circuit of this invention. In FIG. 1(A), $C_1$ represents a parasitic or intentionally-provided capacitance, and $C_{LC}$ represents a picture-element capacitance.

Figure 2A:
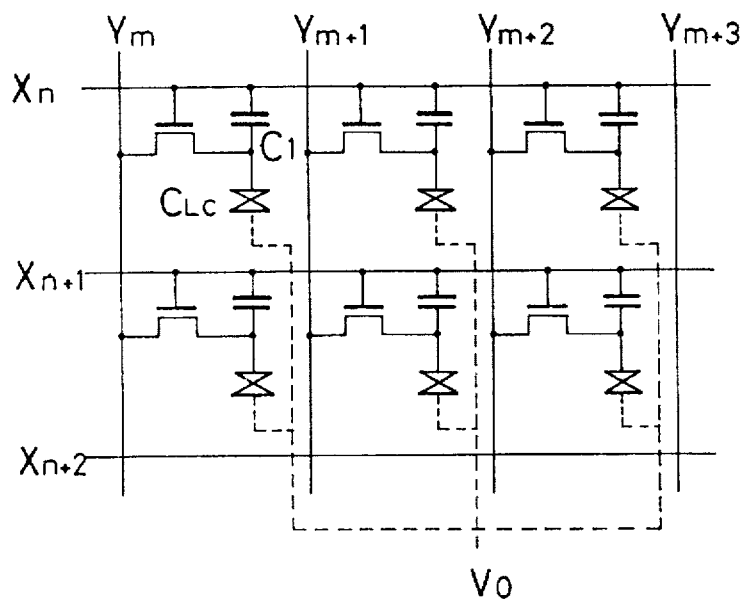
FIG. 2(A) shows a circuit construction of a conventional active matrix circuit.
Figure 2B:
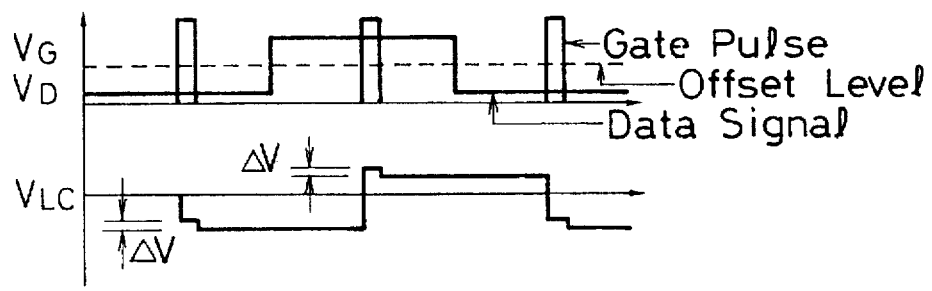
FIG. 2(B) is a schematic view showing a driving example of the conventional active matrix circuit.
Figure 2C:
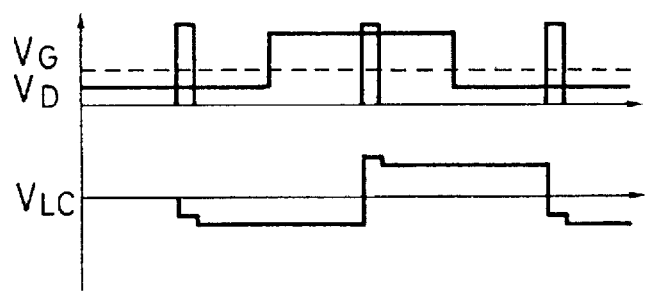
FIG. 2(C) is a schematic view showing another driving example of the conventional active matrix circuit.

In the conventional method, the counter electrode is so designed as to be kept constant at all portions as shown in FIG. 2(A). However, in this embodiment, plural counter electrodes which are formed in stripe shape in parallel to the gate lines are provided, and these stripe-shaped counter electrodes are driven independently of one another (these counter electrodes are represented by $X_n'$, $X_{n+1}'$ in FIG. 1(A)).

FIG. 1(B) is a schematic view showing a driving operation of the circuit as shown in FIG. 1(A). When a voltage is applied to the stripe counter electrode during application of a pulse to the gate line but a time lag exists between the pulse applied to the gate line for the purpose of driving a picture element (TFT) and the voltage applied to the stripe counter electrode for the purpose of canceling (offsetting) $\Delta V$, the voltage is temporally varied, however, it is returned to its original state at once. Accordingly, the effect of such variation of the voltage on an image is very slight, and it is not visually identifiable.

FIG. 1(C) is a top view of the circuit arrangement of this embodiment. This circuit is identical to that of FIG. 1(A), and it may be operated in accordance with the driving operation of FIG. 1(B).

In FIG. 1(C), a reference numeral 101 represents a gate line, and a reference numeral 102 represents a data line. A reference numeral 104 represents a picture-element electrode (pixel electrode), and a reference numeral 103 represents a reverse stagger type of amorphous silicon TFT. The amorphous silicon TFT is formed without adopting the self-alignment method, and it is so designed that a source or drain is overlapped with a gate electrode in large area. This geometrical overlapping and its dispersion are beforehand considered as a design factor. These wiring, element and electrode are formed on a first substrate. On the other hand, on a second substrate confronting the first substrate are formed a plurality of stripe-shaped transparent conductive films as the stripe counter electrodes as indicated by oblique lines (105) in parallel to the gate line. Capacitors are formed between these stripe-shaped electrodes and the picture-element electrodes (pixel electrodes) 104 on the first substrate.

As described above, $\Delta V$ can be canceled (offset) according to this invention. Such a positive method of removing the effect of $\Delta V$ has not been utilized in the prior art, and thus this invention makes an epoch in this point. The above embodiment is described for the reverse stagger type of TFT which is well used for an amorphous silicon TFT, however, the same effect can be obtained by a planar type of TFT which is well used for a polysilicon TFT.

Further, in the above embodiment, a concrete operation method of the active matrix is not described. In place of a conventional analog gradation system, a digital gradation system which has invented by the inventor of this application (for example, as disclosed in Japanese Patent Application No. 3-163873) may be adopted with no problem to perform gradation display using the active matrix.

What is claimed is:

1. An electro-optical device of an active matrix comprising:

a substrate having an active display region;

a plurality of parallel data lines provided on said substrate in a column direction, each of said data lines being independently controllable and separated from one another;

a plurality of parallel gate lines provided on said substrate in a row direction and crossing said data lines so as to form a plurality of data line-gate line intersections, each of said gate lines being independently controllable and separated from one another, a matrix of pixel electrodes on said substrate, each pixel electrode being disposed at one of said data line-gate line intersections;

a matrix of transistors provided on said substrate, each transistor connected with one of said data line-gate line intersections; and a plurality of stripe electrodes formed in parallel with said gate lines, each of said stripe electrodes being independently controllable and separated from one another, wherein each of said stripe electrodes overlaps each row of said pixel electrodes coextensively.

2. The device of claim 1 wherein said stripe electrodes comprise stripe transparent conductive films.

3. The device of claim 1 wherein said stripe electrodes comprise a metal wiring and a transparent electrode connected with said metal wiring.

4. The device of claim 1 wherein said stripe electrodes and said pixel electrodes constitute capacitors.

5. A method of driving an electro-optical device comprising:

a pixel electrode provided on a substrate;

a gate line provided on said substrate;

at least one transistor provided on said substrate and connected with said gate line at a gate thereof and connected with said pixel electrode at one of source and drain thereof; and a stripe electrode formed in parallel with said gate line, said method comprising:

applying a pulse signal to said stripe electrode in accordance with a pulse applied to said gate line, wherein a voltage having an opposite phase to said pulse applied to said gate line is applied to said stripe electrode during the application of said pulse to said gate line.

6. The method of claim 5 wherein said electro-optical device further comprises a data line provided on said first substrate and connected with said transistor at the other one of the source and drain thereof.

7. The method of claim 5 wherein said stripe electrode comprises a stripe transparent conductive film.

8. The method of claim 5 wherein said stripe electrode comprises a metal wiring and a transparent electrode connected with said metal wiring.

9. The method of claim 5 wherein said stripe electrode and said pixel electrode constitute a capacitor.

10. A method of driving an electro-optical device of an active matrix comprising:

a substrate having an active display region;

a plurality of parallel data lines provides on said substrate in a column direction, each of said data lines being independently controllable and separated from one another;

a plurality of gate lines provided on said substrate in a row direction and crossing said data lines so as to form a plurality of data line-gate line intersection, each of said gate lines being independently controllable and separated from one another;

a matrix of pixel electrodes on said substrate, each pixel electrode being disposed at one of said data line-gate line intersections;

a matrix of transistors provided on said substrate, each transistor connected with one of said data line-gate line intersections; and a plurality of stripe electrodes formed in parallel with said gate lines, each of said stripe electrodes being independently controllable and separated from one another, wherein each of said stripe electrodes overlaps each row of said pixel electrodes coextensively, said method comprising:

applying a pulse signal to each of said stripe electrodes synchronously with a pulse applied to the corresponding gate line.

11. The method of claim 10 wherein said stripe electrodes comprise stripe transparent conductive films.

12. The method of claim 10 wherein said stripe electrodes comprise metal wirings and transparent electrodes connected with said metal wirings.

13. The method of claim 10 wherein said stripe electrodes and said pixel electrodes constitute capacitors.

14. An electro-optical device of an active matrix comprising:

a plurality of pixel electrodes provides on a substrate;

a plurality of dam lines provided on said substrate, each of said date lines independently controllable and separate from one another;

a plurality of gate lines provided on said substrate, each of said gate lines independently controllable and separate from one another;

at least one transistor provided on said substrate and connected with one of said gate lines at a gate thereof and connected with corresponding one of said pixel electrodes at one of source and drain thereof and connected with one of said data lines at the other one of the source and drain; and a plurality of stripe electrodes formed in parallel with said gate lines, each of said stripe electrodes independently controllable and separate from one another, wherein a compensation signal is selectively applied to each stripe electrode independently in order to cancel a variation of a voltage applied to a liquid crystal, which is caused by a gate pulse applied to said gate.

15. The device of claim 14 wherein said stripe electrodes comprise stripe transparent conductive films.

16. The device of claim 14 wherein said stripe electrodes comprise a metal wiring and a transparent electrode connected with said metal wiring.

17. The device of claim 14 wherein said stripe electrodes and said pixel electrodes constitute capacitors.

18. An electro-optical device comprising:

a plurality of pixel electrodes provided in a matrix form on a substrate;

transistors connected to said pixel electrodes;

gate lines for supplying gate signals into said transistors; and stripe electrodes formed in stripe shape in parallel with the gate lines, a compensation signal being supplied to each of said stripe electrodes;

wherein said compensation signal cancels a vibration of a voltage applied to a liquid crystal.

19. The device of claim 18 wherein said vibration is caused by each of said gate signals.

20. An electro-optical device comprising:

a plurality of pixel electrodes provided in a matrix form on a substrate;

a plurality of transistors provided in a matrix form on said substrate, each of said pixel electrodes being connected with corresponding one of said transistors;

a plurality of gate lines provided on said substrate in a row direction for supplying gate pulse signals into said transistors;

a plurality of data lines provided on said substrate in a column direction so as to cross said gate lines; and a plurality of stripe electrodes formed in stripe shape in parallel with the gate lines, each of said stripe electrodes overlapping with and being each row of said pixel electrodes coextensively, wherein said stripe electrode is supplied with a pulse signal synchronously with one of said gate pulse signals supplying to the corresponding gate line.

21. The device of claim 20 wherein the pulse signal is a compensation signal for canceling a vibration of a voltage applied to a liquid crystal, which is caused by each of said gate pulse signals.

22. An electro-optical device comprising:

a plurality of pixel electrodes provided in a matrix form on a substrate;

transistors connected to said pixel electrodes;

gate lines for supplying gate signals into said transistors;

stripe electrodes formed in stripe shape in parallel with the gate lines; and a driver circuit connected to said stripe electrodes;

wherein said driver circuit supplies to each of said stripe electrodes a compensation signal for canceling a vibration of a voltage applied to a liquid crystal.

23. The device of claim 22 wherein said vibration is caused by each of said gate signals.

24. An electro-optical device comprising:

a plurality of pixel electrodes provided in a matrix form on a substrate;

a plurality of transistors connected to said pixel electrodes;

a plurality of gate lines provided on said substrate in a row direction for supplying gate pulse signals into said transistors;

a plurality of stripe electrodes formed in stripe shape in parallel with the gate lines, each of said stripe electrodes overlapping with and being each row of said pixel electrodes coextensively; and a driver circuit connected to said stripe electrodes;

wherein said driver circuit supplies with a pulse signal into each of said stripe electrodes substantially synchronous with said gate pulse signal is supplied to one of said gate lines connected to corresponding one of said transistors.

25. The device of claim 24 wherein the pulse signal supplied by said driver circuit is a compensation signal for canceling a vibration of a voltage applied to a liquid crystal, which is caused by each of said gate pulse signals.

* * * * *